(12) United States Patent
Braunecker et al.

(10) Patent No.: US 7,436,492 B2
(45) Date of Patent: Oct. 14, 2008

(54) ELECTRONIC DISTANCE METER FEATURING SPECTRAL AND SPATIAL SELECTIVITY

(75) Inventors: Bernhard Braunecker, Rebstein (CH); Peter Kipfer, Berneck (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/599,530

(22) PCT Filed: Apr. 1, 2005

(86) PCT No.: PCT/EP2005/051478
§ 371 (c)(1),
(2), (4) Date: Dec. 30, 2006

(87) PCT Pub. No.: WO2005/096009
PCT Pub. Date: Oct. 13, 2005

(65) Prior Publication Data
US 2007/0188735 A1 Aug. 16, 2007

Related U.S. Application Data

(60) Provisional application No. 60/558,580, filed on Apr. 2, 2004.

(51) Int. Cl.
*G01C 3/08* (2006.01)
(52) U.S. Cl. ............ 356/4.01; 356/5.01; 356/5.1; 342/118
(58) Field of Classification Search ............ 356/5.01, 356/4.01
See application file for complete search history.

(56) References Cited

U.S. PATENT DOCUMENTS

| | | | | |
|---|---|---|---|---|
| 4,450,460 A | * | 5/1984 | Morimoto | 250/338.1 |
| 4,611,912 A | * | 9/1986 | Falk et al. | 356/5.09 |
| 5,633,706 A | * | 5/1997 | Cho et al. | 356/5.01 |
| 5,903,996 A | * | 5/1999 | Morley | 42/115 |
| 6,111,692 A | * | 8/2000 | Sauter | 359/429 |
| 6,181,412 B1 | * | 1/2001 | Popescu et al. | 356/4.09 |
| 2003/0067645 A1 | * | 4/2003 | Ibsen et al. | 359/124 |
| 2004/0130702 A1 | * | 7/2004 | Jupp et al. | 356/5.01 |
| 2004/0213527 A1 | * | 10/2004 | Martinsson | 385/100 |
| 2004/0246495 A1 | * | 12/2004 | Abe | 356/603 |

FOREIGN PATENT DOCUMENTS

| | | |
|---|---|---|
| DE | 102 00 632 A | 7/2003 |
| FR | 2844603 A | 3/2004 |

OTHER PUBLICATIONS

Noriaki Nishi, Takahisa Jitsuno, Masahiro Nakatsuka and Sadao Nakai, "Improvement of Laser-Beam Irradiation-Intensity Distribution Using Multi Lens Array and Edge-Shaped Plates", [Optical Review vol. 5, No. 5 (1998) 285-290].*

(Continued)

*Primary Examiner*—Thomas H. Tarcza
*Assistant Examiner*—Timothy A Brainard
(74) *Attorney, Agent, or Firm*—Workman Nydegger

(57) ABSTRACT

Disclosed is a distance meter, particularly for telescope arrays in ground-based or space-based applications for detecting surfaces. Said distance meter comprises at least one radiation source for emitting electromagnetic radiation on to a target that is to be measured, a receiver unit with a sensor for receiving the radiation reflected by the target and deriving distance data, and a first spectral filter component. According to the invention, the angular spread of reception of the reflected radiation is limited by means of at least one spatial filter component, especially a fiber laser as a radiation source and receiver component.

18 Claims, 2 Drawing Sheets

OTHER PUBLICATIONS

Morvan L et al.: "Optically pre-amplified lidar-radar." Proceedings of the SPIE—The International Society for Optical Engineering SPIE-Int. Soc. Opt. Eng USA, vol. 4377, 2001, pp. 284-293.

Ledeburhr Arno G et al.: "HiRes camera and lidar ranging system for the Clementine mission." Proceedings of the SPIE, SPIE, Bellingham, VA, US, vol. 2472, Apr. 20, 1995, pp. 62-81.

Fischer K W et al.: "Visible wavelength Doppler lidar for measurement of wind and aerosol profiles during day and night." Optical Engineering, Soc. of Photo-Optical Instrumentation Engineers. Bellingham, US, vol. 34, No. 2, Feb. 1, 1995, pp. 499-511.

* cited by examiner

ELECTRONIC DISTANCE METER FEATURING SPECTRAL AND SPATIAL SELECTIVITY

This application claims the benefit of U.S. Provisional Patent Application No. 60/558,580 filed Apr. 2, 2004, the contents of which are hereby expressly incorporated by reference herein.

The invention relates to an electronic distance meter featuring spectral and spatial selectivity according to the pre-characterizing clause of claim 1.

In many applications of distance measurement, but especially in the case of LIDAR measurements (Light Detecting and Ranging), a useful signal of the distance measurement must be obtained from a radiation background. The intensity thereof may be several times above the intensities of the useful signal. However, owing to its properties, this useful signal can be separated from the background by means of spectral or spatial filters. In general, the measured signal is emitted parallel to or coaxially with the axis of the transmitter, so that the signal is reflected back in the direction of the axis of the transmitter by the generally diffuse surface to be surveyed. Moreover, the spectral range of the emitted light can be chosen so that the broadband background radiation can be separated off by spectrally selective reflection or absorption.

A typical field of use of such distance metres for air-or space-supported applications with LIDAR systems, in which distance measurement to objects or surfaces is effected exclusively or simultaneously with the recording of further parameters and in which a high proportion of foreign or interfering radiation is received.

Here, systems which are used on board aircraft or spacecraft have to meet particular requirements since there are generally strict weight restrictions. Moreover, problems occur in the case of space-supported use owing to the high received radiation intensities and the associated thermal load, for example due to direct sunlight or due to the radiation of hot surfaces themselves, such as, for example, fires or metallic melts. Thus, a satellite which scans the topography of a celestial body with LIDAR from a circumpolar orbit should in principle be capable of handling the different boundary conditions of the day and night side of a planet. The day side gives an extreme proportion of background radiation from which the LIDAR signal to be used has to be obtained. However, similar difficulties can also occur in the case of earth- or air-supported applications over a strongly radiating or reflecting surface, such as, for example, ice, water or desert sand.

For suppressing or screening the background radiation, a multi-stage filtration concept with spectral broadband, narrowband or local or spatial filters is used.

The spectrally broad fraction of the filters has two separate filters reflecting in the ultraviolet (UV) and in the infrared (IR) range.

The UV filter component consists of a dielectric multilayer coating on that side of the instrument aperture which faces the outside. The filter component can, for example, be mounted as a layer on a ZnSe plate in the aperture, wavelengths below 600 nm being reflected without absorption but longer wavelengths being transmitted without absorption. Such filters are very complex but can be technically realized by limitation to a spectral range.

The IR filter component is located downstream of the UV filter component and has a gold mirror which does not absorb for this wavelength band. The ZnSe carrier material of the UV filter component in turn ensures absorption-free radiation transport between the two mirrors.

The spatial filter component is provided by direct or indirect focussing of the radiation onto the sensor used for reception, the sensor surface acting as a field stop. However, the stop effect can also be supplemented or replaced by a fibre located upstream of the sensor. In the case of a perpendicular system, i.e. a system viewing in the nadir orientation on to the surface, the relevant radiation is incident at zero degrees. For focusing, that side of the ZnSe plate which faces away from the outside can be suitably formed, for example as an individual lens or as a lens arrangement. The gold layer of the IR filter component is then arranged in or close to the focal plane of the lens so that, in cooperation, any radiation incident outside the nadir direction is reflected.

The spectrally narrowband filter component is compact, for example in the form of a Fabry-Perot interferometer or fibre grating, having a bandwidth of <1 nm about the LIDAR wavelength, so that any radiation outside this range is suppressed in the nadir direction.

By the multi-stage selection of the incident radiation, the useful radiation of the LIDAR system can be separated from the background radiation, heating of the arrangement being avoided by reflection. Particularly in the case of satellites, this "thermal load" is a critical parameter which has to be minimized since the necessary cooling power has to be taken from the energy supply present. Thus, recordings can also be carried out from strongly emitting surfaces, such as, for example, the day side of a planet close to the sun, in particular without special cooling devices, which leads to mass reductions of about 1.3 kg.

At the same time, the arrangement permits a particularly compact structure which, for example, also allows two-dimensional arrangements. Thus, the inside of the ZnSe plate may be in the form of a 10×10 multi-lens arrangement (lenslet array), so that a short focal distance and hence a short design can be achieved with the same numerical aperture. The lenses can guide the received radiation into the entry orifice of a downstream fibre, these fibres being led either to a separate detector each or to a common detector. The narrowband filter component can be arranged between fibre end and detector. The connection and mechanical fixing of a lens arrangement and fibres can be realised by a hexagonal, honeycomb-like beryllium structure so that strong structures are ensured in combination with low weight.

By assigning individual fibres to a separate detector each, the system redundancy on the detector side can be increased and even formed for the detection of individual photons, without major hardware modifications being necessary.

However, a remaining disadvantage is the spatial division of transmitter and receiver component. Although a compact design is in principle realisable by the possible embodiment described, separate transmitters and receivers nevertheless have a different beam path and an offset of their axes. Moreover, different types of components have to be integrated into one arrangement, which leads to greater technical complexity and increased outlay in manufacture. In addition, owing to the available area, the powers of transmitter and receiver are limited since an increase in the number or area of transmitter apertures reduces that of the receiver apertures.

The object of the invention is to provide a distance meter, in particular for telescope systems, which is simplified in construction.

A further object is the provision of a distance meter having improved utilisation of the available space, area and weight limits.

These objects are achieved, according to the invention, by the subjects of claim 1 or of the dependent Claims or the achievements are further developed.

The invention relates to an electronic distance meter having spectral and spatial selectivity, in particular for telescope arrangements for earth- or space-supported applications.

According to the invention, the fibre arranged downstream of the spectrally broadband filter components is formed by a fibre laser which is used as a common component for transmitter and receiver. Here, light is produced by a pump laser and is input into one of the end faces of the fibre laser. The laser emission produced is used for surveying and on reception, after passing through the broadband filter components, is input back into the fibre laser, but now from the other end face, and is guided by said fibre laser. Since pump light and laser light have different spectral ranges the two components can be separated from one another. In addition, it is possible to introduce time discrimination, which takes into account the time delay due to the finite transit time of the laser signal there and back. After leaving the fibre laser, the reflected light is guided via the narrowband filter component on to the sensor.

Further details of the invention and various embodiments are shown schematically and by way of example in the drawings. Specifically, FIG. 1 shows the schematic diagram of the effect of the broadband filter components;

Figure 1:
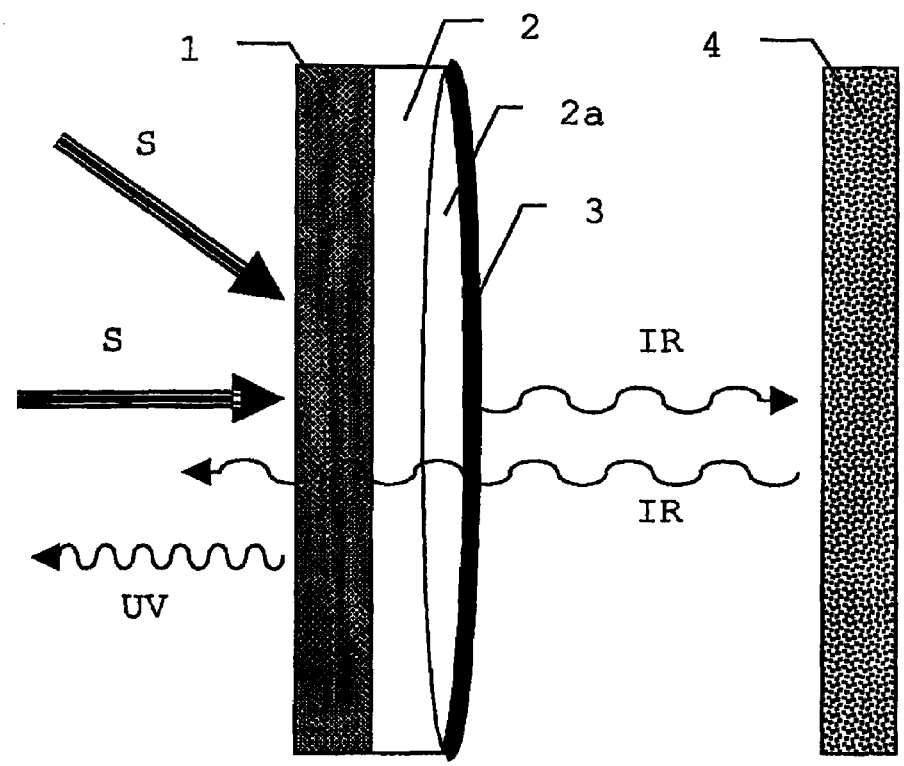

In FIG. 1, the effect of the broadband filter components is explained schematically. Radiation S incident at different angles strikes the UV filter component 1 as a second spectral filter component which reflects the UV component UV of the incident radiation S. The remainder is fed via a ZnSe plate 2 which has a shaped lens structure 2a. The lens 2a carries an anti-reflection coating 3 for improving the transmission of radiation reflected back. By means of this arrangement, the infrared component IR of the radiation is also transmitted but, after passing through an IR filter component 4 as a first spectral filter component, is reflected back so that, after passing again through the ZnSe plate 2 and the UV filter component 1, the IR component IR leaves the distance metre again.

Figure 2:
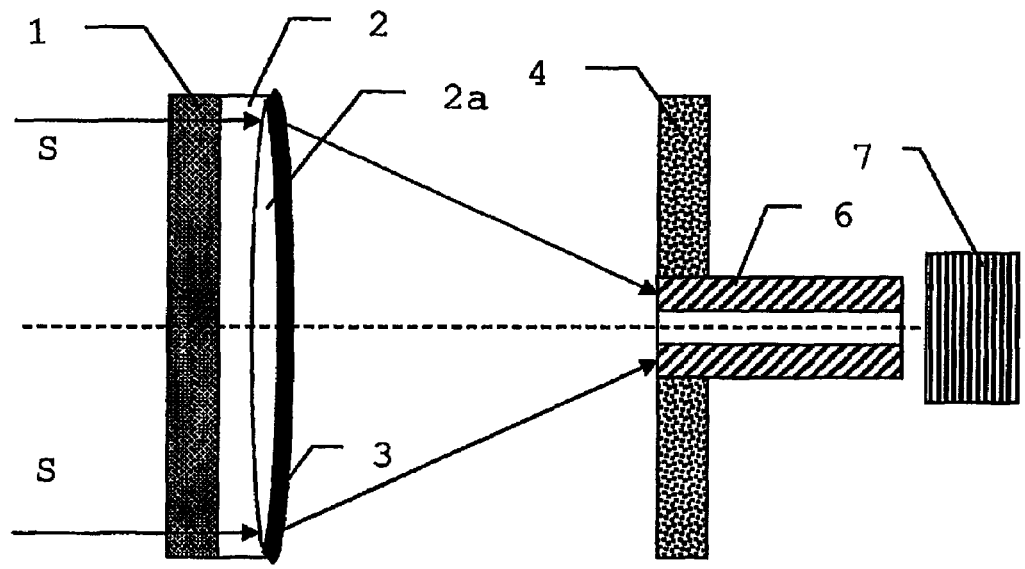
FIG. 2 shows the schematic diagram of the cooperation of the various components.

FIG. 2 shows the schematic diagram of the cooperation of the various further components. After the first filtration explained in FIG. 1, the remaining radiation strikes the spatial filter component 6, which is in the form of a fibre here. This effect can equally also be achieved by a stop or the limitation of a sensor area. The IR filter component 4 is displaced into the focus or fibre entrance, the diagram chosen here being purely schematic and in particular the size relationships of fibre and IR filter component 4 being not represented exactly. Any radiation incident outside the nadir direction is reflected by this arrangement. After the selection of direction by the spatial filter component 6, a further selection step is effected by the narrowband filter component 7 as a third spectral filter component, which may, for example, be in the form of Fabry-Perot interferometer or reflecting grating structure. By the cooperation of the components, the incident radiation S is separated with respect to its spectral and direction components, a major part of the radiation being reflected in order to avoid or at least to reduce heating-up of the distance metre. For simplification, further components of the beam path, such as, for example, lenses, are omitted in this diagram.

Figure 3:
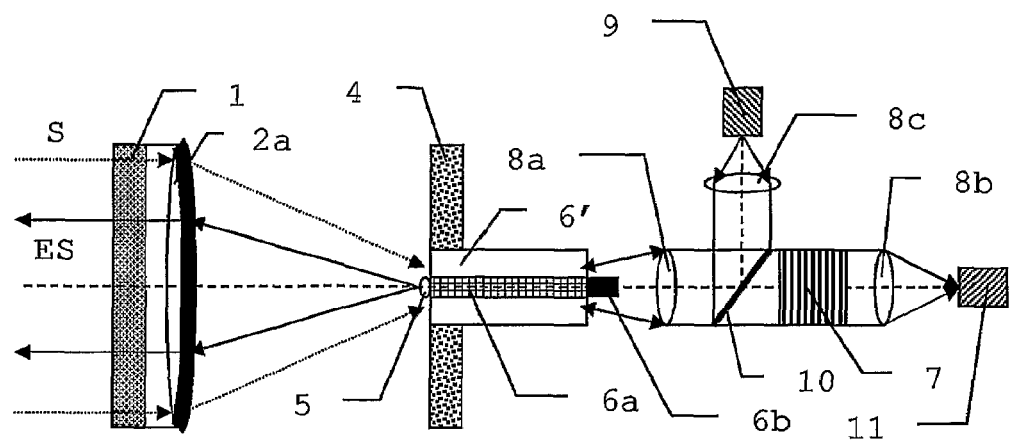
FIG. 3 shows the schematic diagram of a first embodiment according to the invention and FIG. 4 shows the schematic diagram of the relationship between arrangements for realising a second embodiment according to the invention.

FIG. 3 describes the schematic diagram of a first embodiment according to the invention, with the filter steps shown in FIG. 1 and FIG. 2. Incident radiation S is fed via the UV filter component 1, ZnSe plate 2 with the lens structure 2a and the IR filter component 4. After passing through this IR filter component 4, the radiation is input either into the multimodal part of the fibre (case A) or via a microlens 5 into the active fibre core 6a for postamplification of intensity (case B). In the former case, that end of the fibre which is located on the detector side must be provided with an intensity stop 6b, but with a fast switch in case B, for example in the form of a Q-switch. In case B a time-related separation of emission of the fibre laser and switching through to the sensor 11 is then effected, so that the fibre core 6a acts as a postamplifier when the switch is open. Both fibre regions additionally act as spatial filters. The filter laser has, for example, an active fibre core 6a having a diameter of 4 microns, the multimodal structure having a diameter of about 100 microns. In the multimodal structure, the received radiation S is passed through the fibre laser and finally passed via a first lens 8a, a dichroic beam splitter 10, the narrowband filter component 7 and a second lens 8b onto the sensor 11. Parallel to this received beam path, however, the arrangement is also used, according to the invention, for emission of the measuring radiation ES used for the measurement. For the production thereof, a pump light source 9 emits light which is collimated by a third lens 8c and input via the beam splitter 10 and the first lens 8a into the fibre laser. For avoiding adverse affects of the laser emission of the fibre laser on the components of the receiver, in particular on the sensor 11, the fibre laser has, on the receiver side, an end element 6b which optically covers the active fibre core 6a. The measuring radiation ES produced by the fibre laser is brought, via a telescope arrangement comprising microlens 5 and lens structure 2a, into the beam profile desired for the emission. The optical fibre is thus operated in a forward mode of operation as a fibre laser in the emission mode, whereas, in a backward mode of operation, the fibre serves as spatial filter component 6' of the receiver. By means of this dual use, emission and detection are implemented by means of the same substantially optical components, resulting in a design simplification which has advantages with regard to space and weight restrictions.

Figure 4:
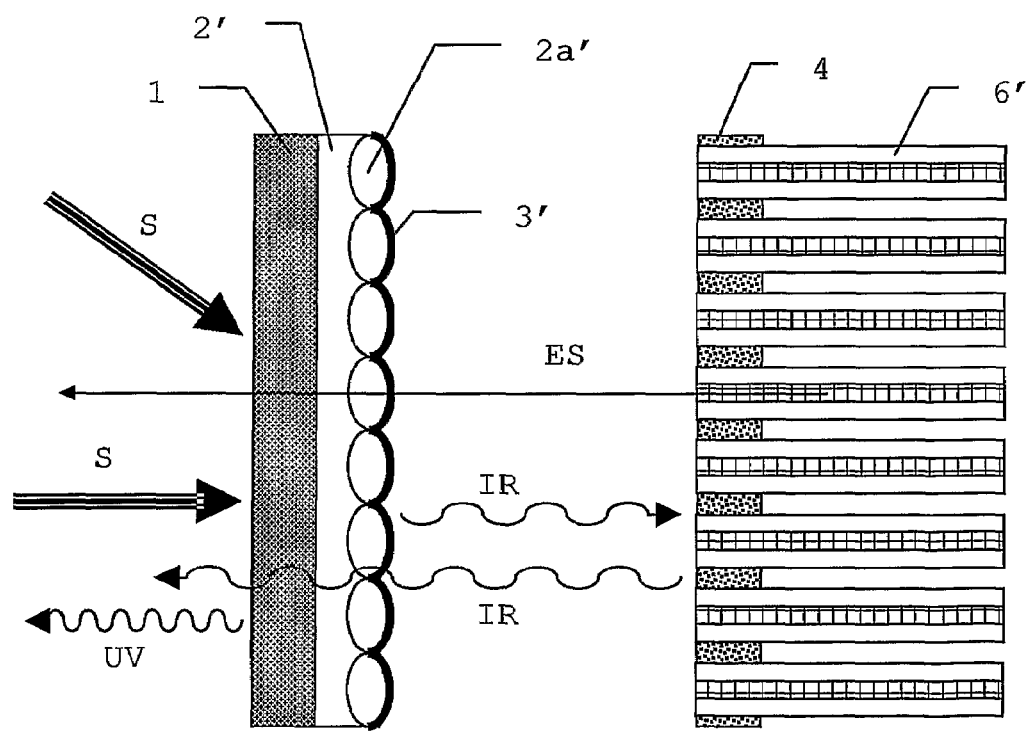
Figure 3:
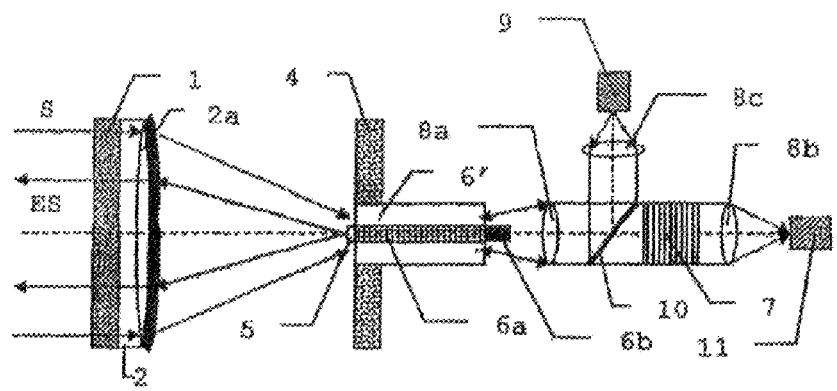
Figure 4:
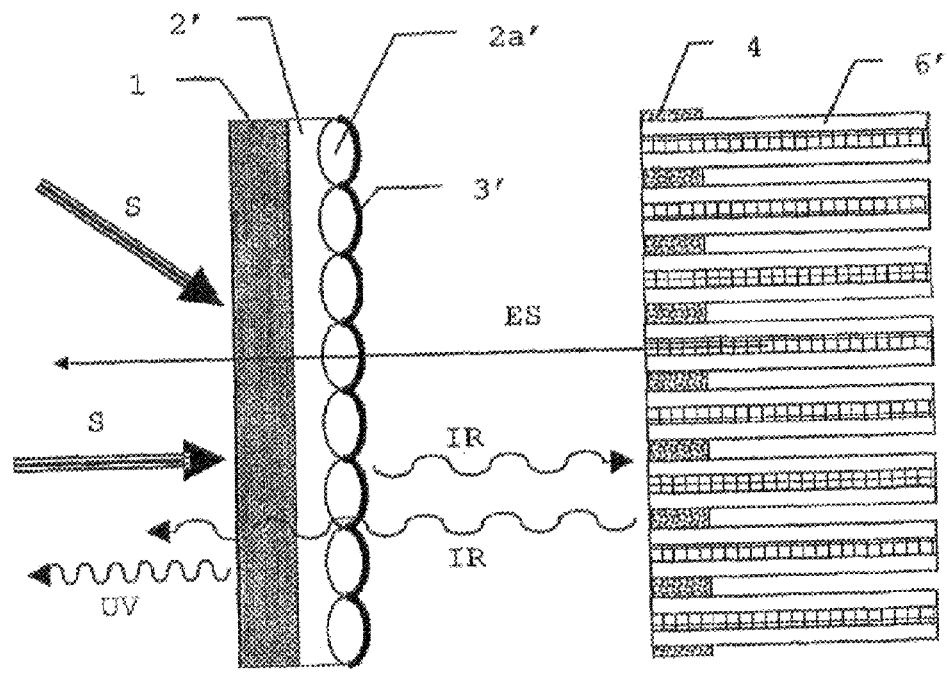

A combination of a plurality of fibres to give a second embodiment according to the invention is shown in FIG. 4. The relationship between arrangements of the fibres for realising a second embodiment according to the invention is shown purely schematically. The ZnSe plate 2' now has a plurality of lens structures 2a' as a multilens array, with each of which a fibre is coordinated as spatial filter component 6'. The IR filter component 4 is mounted between the respective lens structure 2a' and the coordinated fibre entry. Said IR filter components can be formed as a continuous structure but also for each fibre separately. For simplifying the diagram, further components, such as, for example, microlenses, are not shown. Measuring radiation ES is produced by each fibre as a fibre laser and is emitted in turn by means of the coordinated lens structure 2a'.

Thus, the components located downstream of the fibres can likewise be formed or used for each fibre separately or for all fibres or a plurality of fibres together. Thus, an individual sensor can be coordinated with one fibre in each case. Alternatively, however, radiation of a plurality of fibres can also be fed to a common sensor. Likewise, a plurality of fibres can be pumped from a common light source or, as shown in FIG. 3, can have a separate pump light source.

By forming each fibre as a receiver and transmitter, standardization of the various apertures in an arrangement can be achieved, so that both manufacturing and operational advantages, such as, for example, coaxial arrangement of transmitter and receiver, follow, but optimized use of the available space or of the area and of the weight can also be achieved.

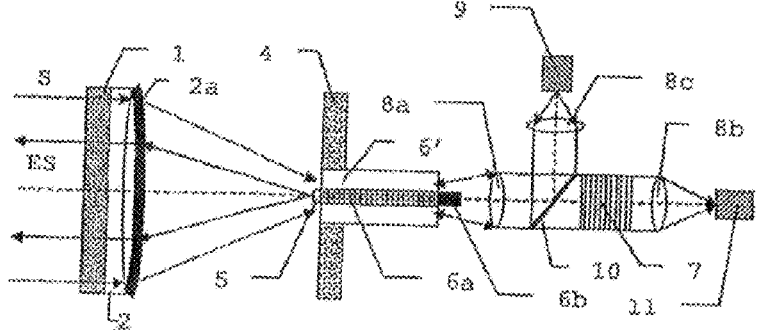

The invention claimed is:

1. A distance meter for telescope arrangements in earth- or space-supported applications for the measurement of surfaces comprising:
   a radiation source for the emission of electromagnetic radiation;
   a receiver unit including a sensor for receiving radiation reflected by a target and for deriving distance information from the received radiation;
   at least one spatial filter component, the spatial filter component being formed and arranged so that the angular range of reception of the reflected radiation is limited; and
   a first spectral filter component located upstream of the spatial filter component in the receiving direction and reflecting in the infrared range for screening background radiation and for avoiding or reducing heating-up of the distance meter.

2. A distance meter according to claim 1, wherein the radiation source includes a laser for producing light for surveying the target.

3. A distance meter according to claim 1, wherein the receiver drives the distance information using the pulse transit time method or the phase measurement method.

4. A distance meter according to claim 1, wherein the spatial filter component includes an optical fiber having a microlens located upstream in the receiving direction.

5. A distance meter according to claim 1, wherein the spatial filter component includes a fiber laser having a multimodal sheath and an active fiber core.

6. A distance meter according to claim 1, further comprising a narrowband spectral filter component between the first spectral filter component and the sensor.

7. A distance meter according to claim 6, wherein the narrowband spectral filter component includes a spectral width of less than 1 nm about the wavelength of the emitted radiation.

8. A distance meter according to claim 6, wherein the narrowband spectral filter component is an interferometric and/or a spatially periodic structure.

9. A distance meter according to claim 6, wherein the narrowband spectral filter component is a Fabry-Perot interferometer or a reflecting grating structure.

10. A distance meter according to claim 1, further comprising at least two spatial filter components.

11. A distance meter according to claim 10, wherein the at least two spatial filter components include a coordinated multi-lens array being formed as a structure of a ZnSe plate.

12. A distance meter according to claim 11, wherein the spatial filter components and multi-lens array are fixed by a hexagonal honeycomb-like structure.

13. A distance meter according to claim 12, wherein the honeycomb-like structure comprises beryllium.

14. A distance meter for telescope arrangements in earth- or space-supported applications for the measurement of surfaces, comprising:
   a radiation source for the emission of electromagnetic radiation;
   a receiver unit including a sensor for receiving radiation reflected by a target and for deriving distance information from the received radiation; and
   a first spectral filter component including at least one spatial filter component, the spatial filter component being formed and arranged in such a way that the angular range of reception of the reflected radiation is limited, wherein the at least one spatial filter component includes a fiber laser having a multimodal sheath and an active fiber core, and wherein the reflected radiation is passed through the multimodal sheath with an optical cover between the fiber core and a sensor.

15. A distance meter for telescope arrangements in earth- or space-supported applications for the measurement of surfaces, comprising:
   a radiation source for the emission of electromagnetic radiation;
   a receiver unit including a sensor for receiving radiation reflected by a target and for deriving distance information from the received radiation; and
   a first spectral filter component including at least one spatial filter component, the spatial filter component being formed and arranged in such a way that the angular range of reception of the reflected radiation is limited, wherein the at least one spatial filter component includes a fiber laser having a multimodal sheath and an active fiber core, and wherein the reflected radiation is passed through the active fiber core with an optical switch between the fiber core and the sensor.

16. A distance meter for telescope arrangements in earth- or space-supported applications for the measurement of surfaces, comprising:
   a radiation source for the emission of electromagnetic radiation;
   a receiver unit including a sensor for receiving radiation reflected by a target and for deriving distance information from the received radiation;
   a first spectral filter component including at least one spatial filter component, the spatial filter component being formed and arranged in such a way that the angular range of reception of the reflected radiation is limited, wherein the at least one spatial filter component includes a fiber laser having a multimodal sheath and an active fiber core, and
   a second spectral filter component located upstream of the first spectral filter component in the receiving direction, wherein the second spectral filter component includes a UV filter.

17. A distance meter according to claim 16, wherein the distance meter does not have any moving components.

18. A distance meter according to claim 16, wherein the first spectral filter is an IR filter.

* * * * *

UNITED STATES PATENT AND TRADEMARK OFFICE
CERTIFICATE OF CORRECTION

PATENT NO. : 7,436,492 B2  Page 1 of 3
APPLICATION NO. : 10/599530
DATED : October 14, 2008
INVENTOR(S) : Braunecker et al.

It is certified that error appears in the above-identified patent and that said Letters Patent is hereby corrected as shown below:

Title Page
Item (75) Inventors, change "Berneck" to --Marbach--
ABSTRACT, change "on to a target" to --onto a target-- (line 4)
Delete Title Page and substitute the Attached Title Page therefor Drawings
Sheet 2, (replace Figure 3)
Delete sheet 2 and replace with attached sheet 2.

Column 1
Line 26, change "air-or" to --air- or--

Column 2
Line 6, change "on to" to --onto--
Line 49, change "component" to --components--
Line 56, change "of transmitter" to --of the transmitter--
Line 65, change "achieved, according" to --achieved, or the achievements are further developed, according--
Lines 66-67, change "Claims or the achievements are further developed." to --Claims.--

Column 4
Line 62, change "FIG. 3" to --FIG. 4--

Signed and Sealed this

Thirteenth Day of January, 2009

JON W. DUDAS
*Director of the United States Patent and Trademark Office*

(12) United States Patent
Braunecker et al.

(10) Patent No.: US 7,436,492 B2
(45) Date of Patent: Oct. 14, 2008

(54) ELECTRONIC DISTANCE METER FEATURING SPECTRAL AND SPATIAL SELECTIVITY

(75) Inventors: Bernhard Braunecker, Rebstein (CH); Peter Kipfer, Berneck (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/599,530
(22) PCT Filed: Apr. 1, 2005
(86) PCT No.: PCT/EP2005/051478

§ 371 (c)(1),
(2), (4) Date: Dec. 30, 2006

(87) PCT Pub. No.: WO2005/096009
PCT Pub. Date: Oct. 13, 2005

(65) Prior Publication Data
US 2007/0188735 A1 Aug. 16, 2007

Related U.S. Application Data

(60) Provisional application No. 60/558,580, filed on Apr. 2, 2004.

(51) Int. Cl.
G01C 3/08 (2006.01)

(52) U.S. Cl. .......... 356/4.01; 356/5.01; 356/5.1; 342/118

(58) Field of Classification Search .......... 356/5.01, 356/4.01
See application file for complete search history.

(56) References Cited

U.S. PATENT DOCUMENTS

| | | | |
|---|---|---|---|
| 4,430,460 A * | 3/1984 | Morimoto | 250/338.1 |
| 4,611,912 A * | 9/1986 | Falk et al. | 356/5.09 |
| 5,633,706 A | 5/1997 | Cho et al. | 356/5.01 |
| 5,903,996 A | 5/1999 | Morley | 42/115 |
| 6,111,692 A | 8/2000 | Sauter | 359/429 |
| 6,181,412 B1 | 1/2001 | Popescu et al. | 356/4.09 |
| 2003/0067645 A1 | 4/2003 | Ibsen et al. | 359/124 |
| 2004/0130702 A1 | 7/2004 | Jupp et al. | 356/5.01 |
| 2004/0213527 A1 | 10/2004 | Martinsson | 385/100 |
| 2004/0246495 A1 | 12/2004 | Abe | 356/603 |

FOREIGN PATENT DOCUMENTS

| DE | 102 00 632 A | 7/2003 |
|---|---|---|
| FR | 2844603 A | 3/2004 |

OTHER PUBLICATIONS

Noriaki Nishi, Takahisa Jitsuno, Masahiro Nakatsuka and Sadao Nakai, "Improvement of Laser-Beam Irradiation Intensity Distribution Using Multi Lens Array and Edge-Shaped Plates", (Optical Review vol. 5, No. 5 (1998) 285-290).*

(Continued)

Primary Examiner—Thomas H. Tarcza
Assistant Examiner—Timothy A Brainard
(74) Attorney, Agent, or Firm—Workman Nydegger

(57) ABSTRACT

Disclosed is a distance meter, particularly for telescope arrays in ground-based or space-based applications for detecting surfaces. Said distance meter comprises at least one radiation source for emitting electromagnetic radiation on to a target that is to be measured, a receiver unit with a sensor for receiving the radiation reflected by the target and deriving distance data, and a first spectral filter component. According to the invention, the angular spread of reception of the reflected radiation is limited by means of at least one spatial filter component, especially a fiber laser as a radiation source and receiver component.

18 Claims, 2 Drawing Sheets